United States Patent
Lu et al.

(10) Patent No.: US 11,971,797 B2
(45) Date of Patent: Apr. 30, 2024

(54) DIGITAL MIRRORING METHOD, SERVER, AND STORAGE MEDIUM

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Xin Lu, Shenzhen (CN); Fu-Fa Cai, Shenzhen (CN); Hui-Feng Liu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 274 days.

(21) Appl. No.: 17/395,738

(22) Filed: Aug. 6, 2021

(65) Prior Publication Data
US 2022/0171692 A1    Jun. 2, 2022

(30) Foreign Application Priority Data
Dec. 1, 2020    (CN) .......................... 202011388414.8

(51) Int. Cl.
| | | |
|---|---|---|
| G06F 11/00 | (2006.01) | |
| G06F 9/48  | (2006.01) | |
| G06F 9/54  | (2006.01) | |
| G06F 11/30 | (2006.01) | |
| G06F 11/34 | (2006.01) | |
| H04L 67/60 | (2022.01) | |

(52) U.S. Cl.
CPC ........ *G06F 11/3055* (2013.01); *G06F 9/4881* (2013.01); *G06F 9/54* (2013.01); *G06F 11/3447* (2013.01); *H04L 67/60* (2022.05)

(58) Field of Classification Search
CPC ...... G06F 11/3055; G06F 9/4881; G06F 9/54; H04L 67/60
See application file for complete search history.

(56) References Cited

U.S. PATENT DOCUMENTS

| | | | |
|---|---|---|---|
| 6,665,266 B1 * | 12/2003 | Brunheroto | H04N 21/4347 370/232 |
| 10,379,995 B1 * | 8/2019 | Walters | G06N 20/10 |
| 10,679,283 B1 * | 6/2020 | Pesce | G06Q 30/0623 |
| 10,908,940 B1 * | 2/2021 | Farhan | H04L 41/0806 |
| 11,016,468 B1 * | 5/2021 | Barker | G07C 3/08 |
| 2005/0166413 A1 * | 8/2005 | Crampton | G01B 5/008 33/503 |
| 2006/0235706 A1 * | 10/2006 | Rodrigue | G06Q 10/10 705/37 |
| 2011/0098837 A1 * | 4/2011 | Yucel | G06F 30/17 700/107 |

(Continued)

FOREIGN PATENT DOCUMENTS

| | | |
|---|---|---|
| CN | 109298685 | 2/2019 |
| CN | 109657354 | 4/2019 |
| CN | 111708332 | 9/2020 |

*Primary Examiner* — Loan L. T. Truong
(74) *Attorney, Agent, or Firm* — ScienBiziP, P.C.

(57) ABSTRACT

A digital mirroring method includes creating a digital model for each physical device of a plurality of physical devices located in a physical space. Once a related data of each physical device is obtained, the related data of each physical device is mapped to corresponding digital model.

2 Claims, 3 Drawing Sheets

---

The server creates a digital model for each physical device of a plurality of physical devices located in a physical space — S1

Each physical device collects a related data of each physical device and sends the related data to the server — S2

The server receives the related data collected by each physical device, and maps the related data collected by each physical device to the corresponding digital model — S3

(56) References Cited

U.S. PATENT DOCUMENTS

| | | | |
|---|---|---|---|
| 2012/0256914 A1* | 10/2012 | Chevochot | G06F 30/13 |
| | | | 345/419 |
| 2016/0196197 A1* | 7/2016 | Hamid | G06F 30/331 |
| | | | 714/33 |
| 2019/0243684 A1* | 8/2019 | Roy | G06F 9/3836 |
| 2019/0303213 A1* | 10/2019 | Chaganti | G06F 9/52 |
| 2021/0028999 A1* | 1/2021 | Balakrishnan | H04L 41/20 |
| 2021/0117253 A1* | 4/2021 | Tang | G06F 9/4887 |
| 2021/0286325 A1* | 9/2021 | Liu | G05B 13/024 |

* cited by examiner

DIGITAL MIRRORING METHOD, SERVER, AND STORAGE MEDIUM

FIELD

The present disclosure relates to monitoring technologies, in particular to a digital mirroring method, a server, and a storage medium.

BACKGROUND

A digital model is a digital representation of a real physical product. It is also an ideal definition of a product by a product designer, and is used to guide product manufacturing, function analysis, and performance analysis. In a whole life process of the real product, the real product undergoes processing, assembly, use, maintenance, repair, and other links. A form of the real product is always in a process of change during the whole life process. As a result, the digital model does not reflect a true situation of the real product. Effective analysis and prediction cannot be made on digital model, coupled with the lack of control over a state of the product's whole life process, are not conducive to continuous improvement to the product, and are not conducive to early warning of major accidents.

DETAILED DESCRIPTION

In order to provide a better understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

Figure 1:
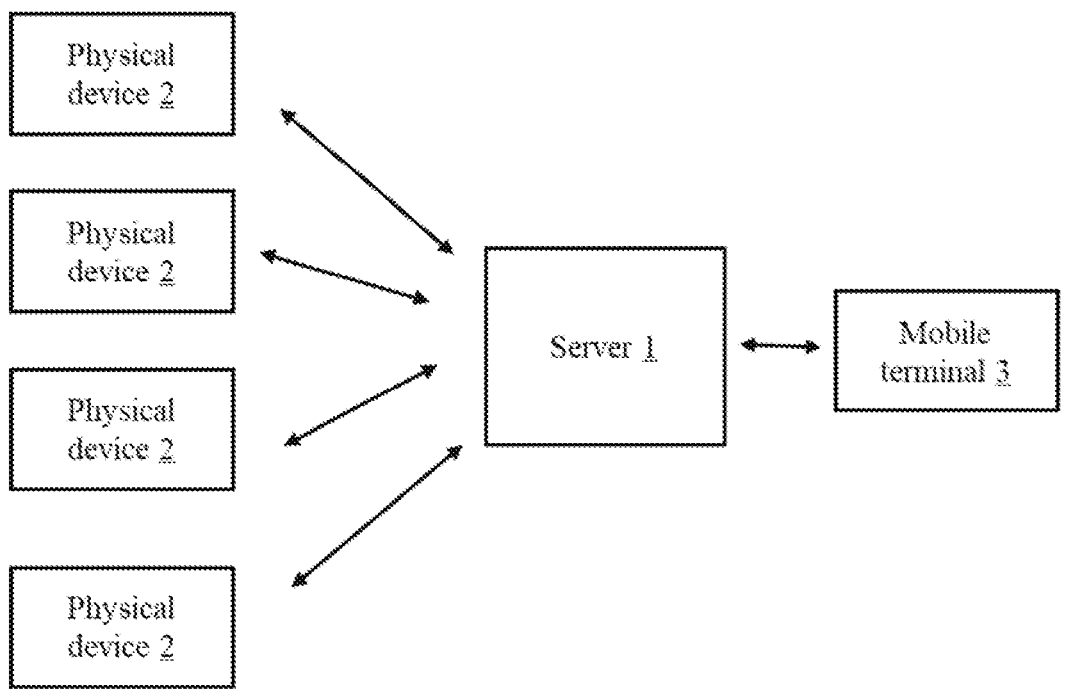
FIG. 1 illustrates a schematic diagram of an environment architecture in which a digital mirroring method is applied.

FIG. 1 illustrates a schematic diagram of an environment architecture in which a digital mirroring method is applied.

In at least one embodiment, the digital mirroring method is applied in an environment composed of a server 1, a plurality of physical devices 2 communicatively connected with the server 1, and a mobile terminal 3. In an embodiment, the server 1 may be a cloud server. The plurality of physical devices 2 may be production devices located in a same physical space such as a production workshop. For example, the plurality of physical devices 2 may be devices for manufacturing mobile phone cases. In an embodiment, the mobile terminal 3 may be a portable device such as a mobile phone or a tablet computer.

Figure 2:
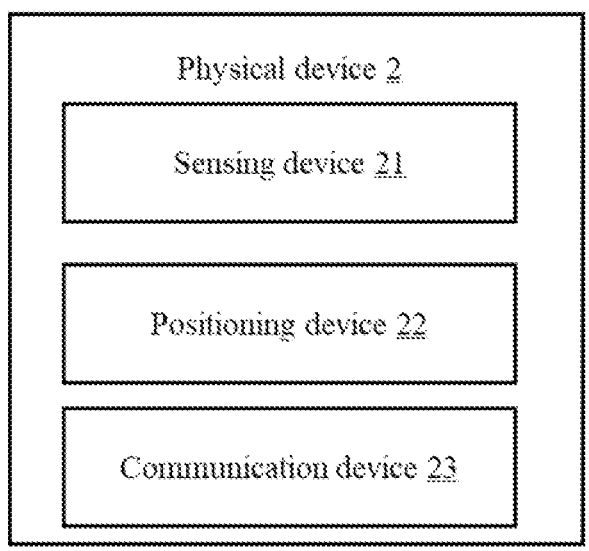
FIG. 2 illustrates a block diagram of a physical device provided by a preferred embodiment of the present disclosure.

As shown in FIG. 2, in this embodiment, the physical device 2 includes, but is not limited to, a sensing device 21, a positioning device 22, and a communication device 23. Specifically, the sensing device 21 may be used to sense environmental information. For example, the sensing device 21 may be a sensor used to sense temperature, humidity, and dust concentration of an environment in which the physical device 2 is located. The positioning device 22 can locate a current location of the physical device 2. The communication device 23 may be a wired or wireless communication device. The physical device 2 can use the communication device 23 to communicate with the server 1. For example, the physical device 2 can send to the server 1 environmental information of the environment in which the physical device 2 is located, location information obtained by the positioning device 22, and working condition information such as a work progress of the physical device 2.

Figure 3:
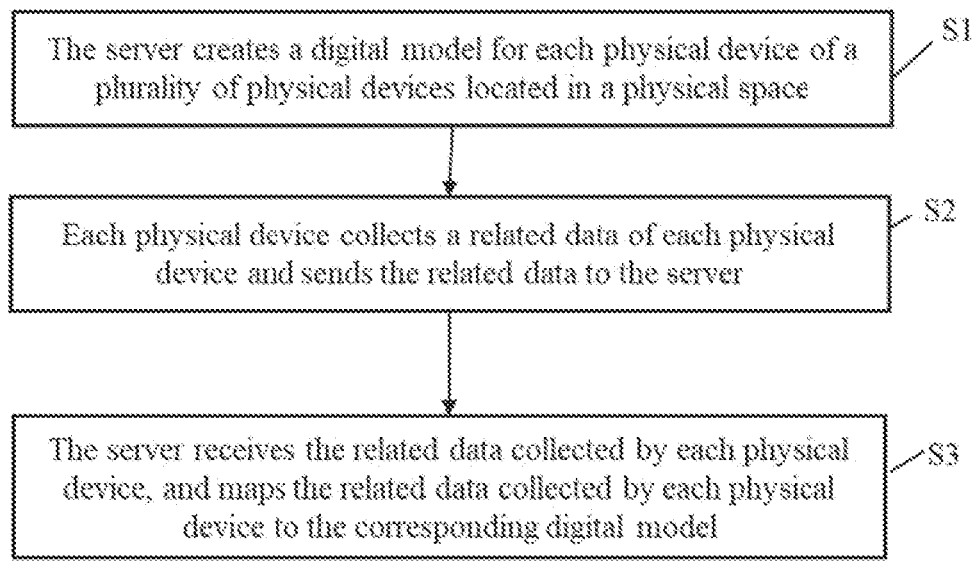
FIG. 3 shows a flow chart of one embodiment of a digital mirroring method.

FIG. 3 shows a flow chart of one embodiment of a digital mirroring method. According to different needs, an order of the blocks in the flowchart can be changed, and some blocks can be omitted.

At block S1, the server 1 creates a digital model for each of the plurality of physical devices 2 located in a physical space, such that a plurality of digital models are obtained.

In one embodiment, each physical device 2 corresponds to one digital model. In this embodiment, the plurality of physical devices 2 may refer to a plurality of devices located in a same physical space, such as a same production workshop. The plurality of physical devices 2 may be devices used to perform the same or different production tasks. For example, the plurality of physical devices 2 may be devices such as molds, production machines, mechanical arms, industrial robots, etc., that are required in a process of manufacturing products such as mobile phone cases, computer cases, or other products.

In one embodiment, the server 1 can create the digital model for each physical device 2 according to a structure, an appearance, a function, input parameters, output parameters of each physical device 2 and a relationship between each physical device 2 and other physical devices 2 of the plurality of physical devices 2.

In this embodiment, the digital model is a representation of a modeling object (i.e., the physical device 2).

In this embodiment, the relationship between each physical device 2 and other physical devices 2 includes an interaction relationship and data information flow relationship between each other.

Those skilled in the art should understand that the digital model created for each physical device 2 by the server 1 can completely represent attributes (such as dimensions such as a length, a width, and a height of each physical device 2), and a function of each physical device 2, and can represent the relationship between each physical device 2 and other physical devices 2, and so on, thereby facilitating effective communication among developers, users, and managers.

In one embodiment, a structure of each digital model may be a layered structure. A core layer of each digital model includes a common and fixed attributes of the plurality of physical devices 2, and an expansion layer of each digital model includes a specified characteristics of the corresponding physical device 2, such as a production place and a manufacturer of the corresponding physical device 2. It can be seen that the server 1 can describe the physical device 2 in an all-round way through the extension layer.

At block S2, each physical device 2 collects a related data of each physical device 2 and sends the related data to the server 1.

In an embodiment, the related data of each physical device 2 includes, but is not limited to, data generated by each physical device 2 in various links such as a link of design, a link of production, a link of use, a link of operation and a link of maintenance. For example, the related data includes a work progress of the physical device 2, a task request sent from the physical device 2 to the server 1, operating parameters of the physical device 2, a location of the physical device 2, a force status, a temperature, a humidity, and a dust concentration of the environment where the physical device 2 is located.

In one embodiment, before the physical device 2 sends the related data to the server 1, the physical device 2 may encrypt the related data using a preset encryption algorithm and obtain encrypted data. Then the physical device 2 sends the encrypted data to the server 1. As a result, security of data transmission can be guaranteed.

At block S3, the server 1 receives the related data collected by each physical device 2, and maps the related data collected by each physical device 2 to the corresponding digital model.

For example, the server 1 creates a digital model M' for a physical device M at block S1. If the server 1 receives the related data collected by the physical device M, then the server 1 maps the related data collected by the physical device M to the digital model M'.

In one embodiment, the server 1 stores the related data collected by each physical device 2 into a buffer queue of a data buffer pool.

In an embodiment, the server 1 buffers the related data collected by each physical device 2 in the data buffer pool in the manner of a queue to prevent data loss during a process of receiving the related data.

In one embodiment, the server 1 can concurrently process the related data in the data buffer pool, and can map the related data to the corresponding digital model.

Specifically, the server 1 may extract the related data of each physical device 2 from the data buffer pool in a multi-threaded manner, thereby speeding up a data processing progress.

According to the above process blocks, it can be seen that the server 1 maps various data information of each physical device 2 such as the data in the link of design, data in the link of production, data in the link of use, and data in the link of maintenance, to the corresponding digital model, thereby establishing a complete life cycle information chain for each physical device 2, and realizing a more comprehensive and true understanding of each physical device 2.

In one embodiment, the server 1 can continuously collect operating parameters of each physical device 2, and evaluate a health status of each physical device 2 in real time by analyzing the operating parameters of each physical device 2.

In one embodiment, the server 1 can predict the health status of each physical device 2 by using a pre-stored prediction model based on the operating parameters of each physical device 2.

In an embodiment, the operating parameters of each physical device 2 include, but are not limited to, total historical operating time of each physical device 2, operating speed of a processor of each physical device 2, memory size and speed of a fan of each physical device 2, and the like. For example, the server 1 can predict a health status of a physical device M based on total historical operating time of the physical device M, operating speed of a processor of the physical device M, memory size and speed of a fan of the physical device M.

In this embodiment, the prediction model may be a classifier obtained by training a neural network based on the collected data. The collected data includes a corresponding relationship between operation parameters and the health status.

In an embodiment, the server 1 may also generate a visualization application based on continuously collected related data of the physical device 2.

For example, the server 1 may use a preset method (such as a chart or a report) to output the related data of each physical device 2 on a display device (such as a dashboard or a billboard).

In an embodiment, the server 1 may respond to a task request of each physical device 2 based on a pre-configured job adjustment strategy.

In an embodiment, the responding to the task request of each physical device 2 based on the pre-configured job adjustment strategy includes (a1)-(a3):

(a1) Obtaining a plurality of task requests from the plurality of physical devices 2.

In an embodiment, each task request of the plurality of task requests may refer to a task that the physical device 2 requests the server 1 to perform. For example, the plurality of task requests include requests each of which the physical device 2 requesting the server 1 to identify a designated object from an image provided by the physical device 2.

(a2) Determining a priority task request from the plurality of task requests based on a job adjustment strategy and the related data of each physical device 2, and setting the physical device 2 that sends the priority task request as a target device.

In this embodiment, the job adjustment strategy includes: first-come first-served strategy (FCFS), short-job-priority strategy (SJPF), high priority first strategy (HPFS), and high response ratio priority strategy (HRFS). When the job adjustment strategy is the first-come first-served strategy, the server 1 preferentially processes the task received first; when the job adjustment strategy is the short-job-priority strategy, the server 1 preferentially processes the task costing the shortest time; when the job adjustment strategy is a high priority first strategy, the server 1 preferentially processes the task with the highest priority. In this embodiment, the high response ratio priority strategy introduces dynamic priorities, the priority of the task increases at a rate as waiting time increases, so that the priority of the task increases as the waiting becomes longer.

(a3) Executing the task corresponding to the priority task request, and feeding back an execution result to the target device.

In one embodiment, the server 1 also receives a task assignment instruction sent by the mobile terminal 3, wherein the task assignment instruction includes an identification code of the physical device 2 and a task. The server 1 controls the corresponding physical device 2 according to the identification code to perform the task.

In an embodiment, the server 1 also controls the physical device 2 in response to user input received from the digital model corresponding to the physical device 2.

In one embodiment, the controlling the physical device 2 in response to the user input received from the digital model corresponding to the physical device 2 includes (b1)-(b2):

(b1) When the input signal is a first signal and the physical device 2 corresponding to the digital model is in a shutdown state, controlling the physical device 2 corresponding to the digital model to turn on.

(b2) When the input signal is a second signal, and the physical device 2 corresponding to the digital model is in a power-on state, controlling the physical device 2 corresponding to the digital model to shut down.

In one embodiment, the first signal and the second signal are the same or different signals.

In an embodiment, the first signal and the second signal may be a single click signal or a double click signal generated by clicking any position of the digital model corresponding to the physical device 2.

In other embodiments, the first signal is a signal generated when a first designated position of the digital model corresponding to the physical device 2 is clicked, and the second signal is a signal generated when a second designated position of the digital model corresponding to the physical device 2 is clicked. The first designated position is different from the second designated position.

It should be understood that the described embodiments are for illustrative purposes only, and are not limited by this structure in the scope of the present disclosure.

Figure 4:
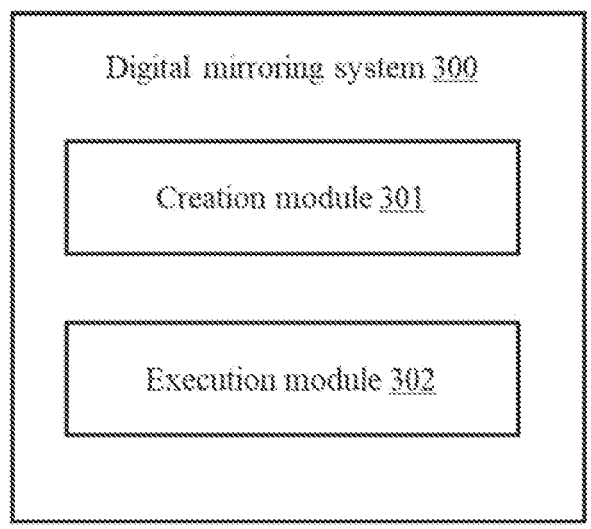
FIG. 4 shows one embodiment of modules of a digital mirroring system of the present disclosure.
Figure 5:
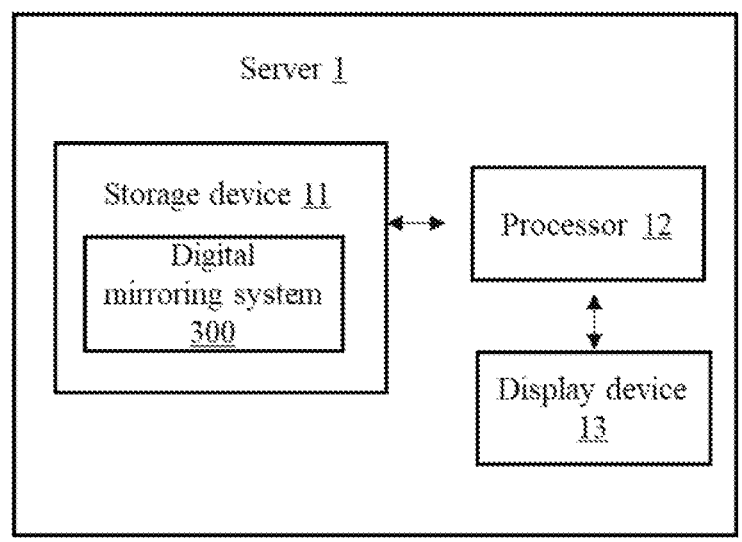
FIG. 5 shows one embodiment of a schematic structural diagram of a server of the present disclosure.

Refer to FIG. 4, which is a block diagram of a digital mirroring system provided by a preferred embodiment of the present disclosure. Refer to FIG. 5, which is a block diagram of a server provided by a preferred embodiment of the present disclosure. In some embodiments, the digital mirroring system 300*t* runs in the server 1. The digital mirroring system 300 may include a plurality of modules composed of program code segments. The program code of each program segment of the digital mirroring system 300 can be stored in a storage device 11 of the server 1 and executed by at least one processor 12 to realize the digital mirroring function (see FIG. 3 for details).

As shown in FIG. 4, the digital mirroring system 300 can be divided into a plurality of modules according to performing functions. The modules may include: a creation module 301 and an execution module 302. The module referred to in the present disclosure refers to a series of computer program segments that can be executed by at least one processor and can complete fixed functions, and are stored in a storage device. In this embodiment, the functions of each module will be described in detail in subsequent embodiments.

Specifically, the creation module 301 creates corresponding digital models for a plurality of physical devices 2 in the physical space. The execution module 302 can obtain related data of each of the plurality of physical device; and map the related data of each physical device 2 to the corresponding digital model.

FIG. 5 shows one embodiment of a schematic structural diagram of a server. In an embodiment, the server 1 includes a storage device 11, at least one processor 12, and a display device 13. It should be understood by those skilled in the art that the structure of the server 1 shown in FIG. 5 does not constitute a limitation of the embodiment of the present disclosure. The server 1 may have a bus type structure or a star type structure, and the server 1 may further include other hardware or software, or the server 1 may have different component arrangements. The server 1 can be a computer device, a mobile device, a tablet computer, or another suitable device.

In at least one embodiment, the server 1 can include a terminal that is capable of automatically performing numerical calculations and/or information processing in accordance with pre-set or stored instructions. The hardware of terminal can include, but is not limited to, a microprocessor, an application specific integrated circuit, programmable gate arrays, digital processors, and embedded devices.

It should be noted that the server 1 is merely an example, and other existing or future electronic products may be included in the scope of the present disclosure and are included in the reference.

In some embodiments, the storage device 11 can be used to store program codes of computer readable programs and various data, such as the digital mirroring system 300 installed in the server 1, and automatically access the programs or data with high speed during running of the server 1. The storage device 11 can include a read-only memory (ROM), a programmable read-only memory (PROM), an erasable programmable read only memory (EPROM), an one-time programmable read-only memory (OTPROM), an electronically-erasable programmable read-only memory (EEPROM)), a compact disc read-only memory (CD-ROM), or other optical disk storage, magnetic disk storage, magnetic tape storage, or any other non-transitory storage medium readable by the server 1 that can be used to carry or store data.

In some embodiments, the at least one processor 12 may be composed of an integrated circuit, for example, may be composed of a single packaged integrated circuit, or may be composed of multiple integrated circuits of same function or different functions. The at least one processor 12 can include one or more central processing units (CPU), a microprocessor, a digital processing chip, a graphics processor, and various control chips. The at least one processor 12 is a control unit of the server 1, which connects various components of the server 1 using various interfaces and lines. By running or executing a computer program or modules stored in the storage device 11, and by invoking the data stored in the storage device 11, the at least one processor 12 can perform various functions of server 1 and process data of server 1. For example, the function of performing digital mirroring.

Although not shown, the server 1 may further include a power supply (such as a battery) for powering various components. Preferably, the power supply may be logically connected to the at least one processor 12 through a power management device, thereby, the power management device manages functions such as charging, discharging, and power management. The power supply may include one or more of a DC or AC power source, a recharging device, a power failure detection circuit, a power converter or inverter, a power status indicator, and the like. The server 1 may further include various sensors, such as a BLUETOOTH module, a WI-FI module, and the like, and details are not described herein.

It should be understood that the described embodiments are for illustrative purposes only and are not limited by this structure in the scope of the present disclosure.

The above-mentioned integrated unit implemented in the form of a software module may be stored in a computer readable storage medium. The above-mentioned software function module is stored in a storage medium and includes a number of instructions to make a server (which may be a personal computer etc.) or a processor execute part of the method described in each embodiment of the present disclosure.

In at least one embodiment, as shown in FIG. 5, the at least one processor 12 can execute various types of applications (such as the digital mirroring system 3)) installed in the server 1, program codes, and the like. For example, the at least one processor 12 can execute the modules 301-302 of the digital mirroring system 300.

In at least one embodiment, the storage device 11 stores program codes. The at least one processor 12 can invoke the program codes stored in the storage device to perform functions. For example, the modules described in FIG. 3 are program codes stored in the storage device 11 and executed by the at least one processor 12, to implement the functions of the various modules for the purpose of digital mirroring.

In at least one embodiment, the storage device 11 stores one or more instructions (i.e., at least one instruction) that are executed by the at least one processor 12 to achieve the purpose of digital mirroring as shown in FIG. 3.

The above description is only embodiments of the present disclosure, and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A digital mirroring method applied to a server, the method comprising:
creating a digital model for each physical device of a plurality of physical devices, the plurality of physical devices being located in a same production workshop, and being used to perform different production tasks, wherein the digital model created for each physical device comprises a core layer and an expansion layer, the core layer comprises a common and fixed attributes of the plurality of physical devices, and the expansion layer comprises a production place and a manufacturer of the corresponding physical device;
obtaining a related data of each physical device;
mapping the related data of each physical device to corresponding digital model; and
controlling the physical device in response to user input received from the digital model corresponding to the physical device, comprising:
in response that the user input is a first signal and the physical device corresponding to the digital model is in a shutdown state, turning on the physical device corresponding to the digital model;
in response that the user input is a second signal, and the physical device corresponding to the digital model is in a power-on state, shutting down the physical device corresponding to the digital model;
wherein the first signal is a signal generated when a first designated position of the digital model corresponding to the physical device is clicked, and the second signal is a signal generated when a second designated position of the digital model corresponding to the physical device is clicked, the first designated position is different from the second designated position.

2. A server comprising:
a storage device;
at least one processor; and
the storage device storing one or more programs, which when executed by the at least one processor, cause the at least one processor to:
create a digital model for each physical device of a plurality of physical devices, the plurality of physical devices being located in a same production workshop, and being used to perform different production tasks, wherein the digital model created for each physical device comprises a core layer and an expansion layer, the core layer comprises a common and fixed attributes of the plurality of physical devices, and the expansion layer comprises a production place and a manufacturer of the corresponding physical device;
obtain a related data of each physical device;
map the related data of each physical device to corresponding digital model; and
control the physical device in response to user input received from the digital model corresponding to the physical device, comprising:
in response that the user input is a first signal and the physical device corresponding to the digital model is in a shutdown state, turning on the physical device corresponding to the digital model;
in response that the user input is a second signal, and the physical device corresponding to the digital model is in a power-on state, shutting down the physical device corresponding to the digital model;
wherein the first signal is a signal generated when a first designated position of the digital model corresponding to the physical device is clicked, and the second signal is a signal generated when a second designated position of the digital model corresponding to the physical device is clicked, the first designated position is different from the second designated position.

* * * * *